United States Patent [19]

Laufer

[11] Patent Number: 5,194,277
[45] Date of Patent: Mar. 16, 1993

[54] PROCESS FOR PREPARING LOW FAT POTATO CHIPS AND SHOESTRING POTATOES

[76] Inventor: Stephen Laufer, 917 ½ Douglas St., Los Angeles, Calif. 90026

[21] Appl. No.: 712,943

[22] Filed: Jun. 10, 1991

[51] Int. Cl.⁵ ............................................. A23L 1/217
[52] U.S. Cl. ..................................... 426/243; 426/637
[58] Field of Search ............... 426/241, 242, 243, 510, 426/511, 523, 637

[56] References Cited

U.S. PATENT DOCUMENTS

| | | | |
|---|---|---|---|
| 3,881,028 | 4/1975 | Capossela et al. | 426/243 X |
| 4,283,425 | 8/1981 | Yuan et al. | 426/242 X |
| 4,906,483 | 3/1990 | Kloos | 426/243 |
| 4,919,965 | 4/1990 | Childers | 426/523 X |
| 5,049,711 | 9/1991 | August | 426/241 X |

FOREIGN PATENT DOCUMENTS 3443218 5/1986 Fed. Rep. of Germany ...... 426/242

Primary Examiner—Arthur L. Corbin
Attorney, Agent, or Firm—Lyon & Lyon

[57] ABSTRACT

A process for preparing potato chips and shoestring potatoes in which no additional fat content is added to the potato and none of the natural foodstuffs are removed. The process comprises the steps of slicing a potato to produce a plurality of potato slices or strips of the desired configuration and microwave heating the slices or strips for a period of about six to nine minutes to produce a product having substantially the same flavor, color and crispness as deep-fried potato chips or shoestring potatoes. The potato slices or strips can be steamed or baked prior to microwave heating to reduce the microwave heating time by about fifty percent.

5 Claims, No Drawings

PROCESS FOR PREPARING LOW FAT POTATO CHIPS AND SHOESTRING POTATOES

BACKGROUND OF THE INVENTION

The present invention relates to a process for producing potato chips and shoestring potatoes, which have substantially the same flavor, color and crispness as the conventional deep-fried products but in which no fat content is added to the potato and no foodstuff is removed. Potato chips and shoestring potatoes are typically produced by deep frying thin slices or strips of raw potatoes in an oil. The deep frying process reduces the water content in the potatoes while adding oil to the product to produce the desired color and crispness, However, the resulting product contains considerable oil, and thus fat, which is generally unhealthy.

With increased public awareness of the benefits of low fat foods, efforts have been undertaken to develop alternate methods for producing the ever popular potato chip. Examples of such efforts are seen in U.S. Pat. Nos. 4,277,510, 4,283,425, 4,749,579 and 4,906,483. While reducing the fat content of the resulting chip in comparison to the conventional deep frying process, the processes described in U.S. Pat. Nos. 4,277,510 and 4,749,579 continue to employ the step of frying the slices of potato in an oil and thus continue to add fat to the chip. The process described in U.S. Pat. No. 4,906,483 like the present invention, employs microwave heating in lieu of deep frying, but additionally teaches the removal of the starch from the potato chip and thus does not provide the whole food content of the potato. The process described in U.S. Pat. No. 4,283,425 also employs microwave cooking in lieu of frying to avoid the addition of fat to the chip but teaches the necessity of coating the chip prior to the microwave heating thereof with a globular protein such as soy isolate or egg albumen. As certain individuals are allergic to soy and dairy products and others prefer natural foods with no additives, such a process would be somewhat limited in its appeal. In contrast to the above processes, the process of the present invention not only provides potato chips having substantially the same flavor, color and crispness as conventional deep-fried potato chips, without the need for deep-frying, but does so without the addition or deletion of any food content to the natural potato. The result is a completely natural potato chip which is very low in fat.

SUMMARY OF THE INVENTION

Briefly, the present invention is directed to a process for preparing potato chips having substantially the same flavor, color and crispness as deep-fried potato chips but in which no fat content is added to the natural potato and none of the natural foodstuffs therein are removed. The process comprises the steps of washing the potatoes to remove foreign matter from the skin thereof, cutting the potato into thin slices and heating the slices of potato in a microwave oven for about six to nine minutes. Depending on the food contact surface used in the microwave oven, the slices of potato can be rotated 180° at the mid-point of the microwave heating step to prevent the potato slices from adhering to the contact surface. After heating, the chips are removed from the microwave oven and are ready for consumption. If desired, salt or other natural seasonings can be added prior to the microwave heating thereof. To reduce the cooking time in the microwave oven by about 50%, the potato slices can be steamed or baked prior to microwaving. To facilitate handling of steamed slices, the wet slices can be dried with convection heat prior to microwaving. In addition to producing low fat potato chips, the process of the present invention can also be used to produce shoestring potatoes without the addition of any fat and without removing any of the natural foodstuffs of the potato.

It is the principal object of the present invention to provide an improved process for preparing potato chips which does not add any additional fat content to the natural potato to provide a low fat potato chip nor removes any of the natural foodstuffs from the potato.

It is another object of the present invention to provide an improved process for preparing potato chips which obviates the need to add any other food item or chemical to the potato during the process.

It is yet another object of the present invention to provide an improved process for preparing potato chips which eliminates the need to fry the chips in oil during the process.

It is yet another object of the present invention to provide an improved process for preparing shoestring potatoes which does not add any additional fat content to the natural potato to provide a low fat shoestring potato and which does not remove any of the natural foodstuffs from the potato.

These and other objects and advantages of the present invention will become readily apparent from the following detailed description.

DESCRIPTION OF THE PREFERRED EMBODIMENT

In the process of the present invention, the potatoes are first washed to remove any foreign matter from the exterior skin thereof. The washed potatoes are then sliced, preferably without removing the skins, to a thickness of about 1/16 of an inch. The potato slices are then laid on a ceramic or other suitable plate, placed in a microwave oven and heated in the microwave oven for about six to nine minutes at a high setting with eight minutes being the optimum heating time. To prevent the potato slices from adhering to the plate, the slices are preferably turned 180° at the mid-point of the heating. If a non-stick plate surface is employed, turning of the potato slices is not necessary. Alternatively, a support tray could be employed for stacking the slices on and in a vertical disposition within the microwave oven to prevent the potato slices from sticking to the plate without the need for interrupting the heating process to turn the slices. For commercial operations, a continuous heating cycle could be employed in which the potato slices are placed on a conveyor which runs thorough a microwave heating station for mass producing the potato chips of the present invention. At the completion of the heating period in the microwave oven, the chips are removed and are ready for consumption. If desired, salt or other natural seasonings can be added to the potato slices prior to the heating thereof in the microwave oven.

In certain instances, it may be desirable to reduce the time of the microwave heating process for energy or other considerations. By steaming or baking the slices of potatoes prior to microwaving, the time necessary for microwaving the potato slices can be reduced by about 50%. It has been found that by steaming the potato slices for about two to five minutes, the microwave heating time can be reduced to about three to six minutes. Baking the slices for about two to five minutes at a temperature of 500 degrees Fahrenheit also reduces the microwave heating time to about three to six minutes. I those instances in which steaming is employed, it may also be desirable to dry the potato slices prior to microwave heating by a brief period of convection heating to facilitate handling of the potato slices.

In addition to potato chips, the aforesaid process can be used to produce shoestring style potatoes. To produce shoestring potatoes, the same process is employed except that the potatoes, after washing are sliced into elongated or curved strips of the desired configuration and length, preferably about 1/16–1/8 in. in thickness, and then heated in the microwave oven for about six to eleven minutes depending on thickness of the strips. As with the potato slices, the potato strips can also be steamed or baked prior to microwaving to reduce the microwave heating time. As shoestring potatoes are generally somewhat thicker than potato chips, their steaming and baking times will be slightly greater than the corresponding times for pre-cooking the slices used in the production of potato chips. By steaming the potato strips for about three to five minutes or baking the strips at about 500° Fahrenheit for three to five minutes, the microwave heating time is reduced to about three to seven and one half minutes. Other tubers and vegetables such as sweet potatoes, yams and beets could also be prepared utilizing the aforesaid process.

Various changes and modifications may be made in carrying out the present invention without departing from the spirit and scope thereof. Insofar as these changes and modifications are within the purview of the appended claims, they are to be considered as part of the present invention.

I claim:

1. A method for preparing a potato product having a low fat content in which none of the natural foodstuffs of the potato are removed, said method consisting of the following steps: cutting a potato to produce a plurality of potato slices; steaming the slices for a period of about two to five minutes; and microwave heating the steamed slices for a period of about three to six minutes to produce a product having a substantially the same flavor, color and crispness as deep-fried potato chips and having no added fat content.

2. The method of claim 1 including the step of drying the potato slices prior to the microwave heating step.

3. A method for preparing a potato product having a low fat content in which none of the natural foodstuffs of the potato are removed, said method consisting of the following steps: cutting a potato to produce a plurality of potato slices; baking the slices at about 500 degrees Fahrenheit for a period of two to five minutes; and microwave heating the baked slices for a period of about three to six minutes to produce a product having substantially the same flavor, color and crispness as deep-fried potato chips and having no added fat content.

4. A method for preparing a potato product having a low fat content in which none of the natural foodstuffs of the potato are removed, said method consisting of the following steps: cutting a potato to produce a plurality of potato strips; steaming the strips for a period of about three to five minutes; and microwave heating the steamed strips for a period of about three to seven and one half minutes to produce a product having substantially the same flavor, color and crispness as deep-fried shoestring potatoes and having no added fat content.

5. A method for preparing a potato product having a low fat content in which none of the natural foodstuffs of the potato are removed, said method consisting of the following steps: cutting a potato to produce a plurality of potato strips; baking the strips at about 500 degrees Fahrenheit for about three to five minutes; and microwave heating the baked strips for a period of three to seven and one half minutes to produce a product having substantially the same flavor, color and crispness as deep-fried shoestring potatoes and having no added fat content.

* * * * *